(12) United States Patent
Keyvani (10) Patent No.: US 10,929,679 B1
(45) Date of Patent: Feb. 23, 2021

(54) PRODUCT ASSEMBLY GUIDANCE USING COMPUTER VISION REAL-TIME OBJECT DETECTION AND AUGMENTED REALITY WORKING AUTONOMOUSLY

(71) Applicant: Robert Reza Keyvani, Sarasota, FL (US)

(72) Inventor: Robert Reza Keyvani, Sarasota, FL (US)

( * ) Notice: Subject to any disclaimer, the term of this patent is extended or adjusted under 35 U.S.C. 154(b) by 0 days.

(21) Appl. No.: 16/739,017

(22) Filed: Jan. 9, 2020

(51) Int. Cl.
G06K 9/00 (2006.01)
G06K 9/62 (2006.01)
G06N 3/08 (2006.01)

(52) U.S. Cl.
CPC ..... *G06K 9/00744* (2013.01); *G06K 9/00718* (2013.01); *G06K 9/6256* (2013.01); *G06N 3/08* (2013.01)

(58) Field of Classification Search
CPC ........... G06K 9/00671; G06K 9/00718; G06K 9/00744; G06K 9/6256; G06T 19/006; G06T 2219/2008; G06N 3/08; G06N 20/00
USPC ........................................................ 382/103
See application file for complete search history.

(56) References Cited

U.S. PATENT DOCUMENTS

2012/0069051 A1* 3/2012 Hagbi .................. G06T 19/006
345/633
2019/0362556 A1* 11/2019 Ben-Dor ............ G06K 7/10396

* cited by examiner

Primary Examiner — Daniel G Mariam
(74) Attorney, Agent, or Firm — David Postolski, Esq.; Gearhart Law LLC (57) ABSTRACT

Disclosed herein are system, method, and computer program product embodiments for utilizing non-RAM memory to implement a cache. An embodiment operates by providing a graphical user interface for entering information associated with assembly instructions and receiving assembly instruction information through the user interface. The assembly instruction information include a computer vision real-time object detection model trained to identify a plurality of parts or objects in a video stream, one or more instruction step nodes a mapping to at least one of the plurality of parts or objects identifiable by the computer vision real-time object detection model, and one or more attributes associated with the one or more instruction step nodes. An assembly instruction set is generated based on the received assembly instruction information and transmitted to a client device for displaying a graphical user interface showing graphical elements superimposed on a video stream based on the assembly instruction set.

18 Claims, 7 Drawing Sheets

PRODUCT ASSEMBLY GUIDANCE USING COMPUTER VISION REAL-TIME OBJECT DETECTION AND AUGMENTED REALITY WORKING AUTONOMOUSLY

BACKGROUND

Technical Field

Embodiments generally relate to computer systems and methods for providing an augmented reality graphical interface for assisting persons in identification of objects and assembly of products.

Background

Augmented reality (AR) refers to the addition of digital content onto a live camera feed, making the digital content look as if it is part of the physical world around a viewer. A common application of AR involves a user pointing a smartphone camera around his or her environment and viewing the live camera feed on the phone screen with digital augmentations. Examples of smartphone applications applying this concept include Google Lens, Just a Line, IKEA Place, and games like Pokémon GO and Ingress.

Some developers have experimented with providing AR assisted guidance, such as guidance to perform tasks or assemble products by identifying relevant parts in the pictures and providing instructions in AR form. However, current solutions fail to provide a useful and convenient user experience for both consumers and product providers.

BRIEF DESCRIPTION OF THE DRAWINGS

The accompanying drawings are incorporated herein and form a part of the specification.

DETAILED DESCRIPTION

Provided herein are system, method and/or computer program product embodiments, and/or combinations and sub-combinations thereof, for creating and displaying real-time augmented reality guidance for object identification and product assembly. While the embodiments described herein are generally exemplified in the context of product assembly, they are generally applicable to any system that aids users in identifying objects and following a series of steps.

In particular embodiments, an AR assembly guidance system uses real-time object detection in combination with assembly instruction sets to autonomously generate AR guidance in real time. Real-time object detection involves using artificial intelligence (AI) techniques, such as deep learning computer vision models, to look at a video feed and label things its sees. Example applications of real-time object detection include self-driving cars, empty parking space detectors, software that maps people's faces to names, etc. In particular embodiments, a client-side application retrieves a set of instructions mapped to a real-time object detection model. The application may allow a user to point a camera to a set of parts and display an augmented camera feed using AR techniques to label the parts and show visual cues that aid the user in assembling the product. The visual cues may include labels, arrows, text, multimedia guidance, etc.

In particular embodiments, a provider-side application may provide a user interface for inputting a real-time object detection model and instruction sets mapping parts and objects in the model to instructions steps and relationships. In this manner, AR instruction sets can be automatically generated for any products for which a real-time object detection model is available.

Figure 1:
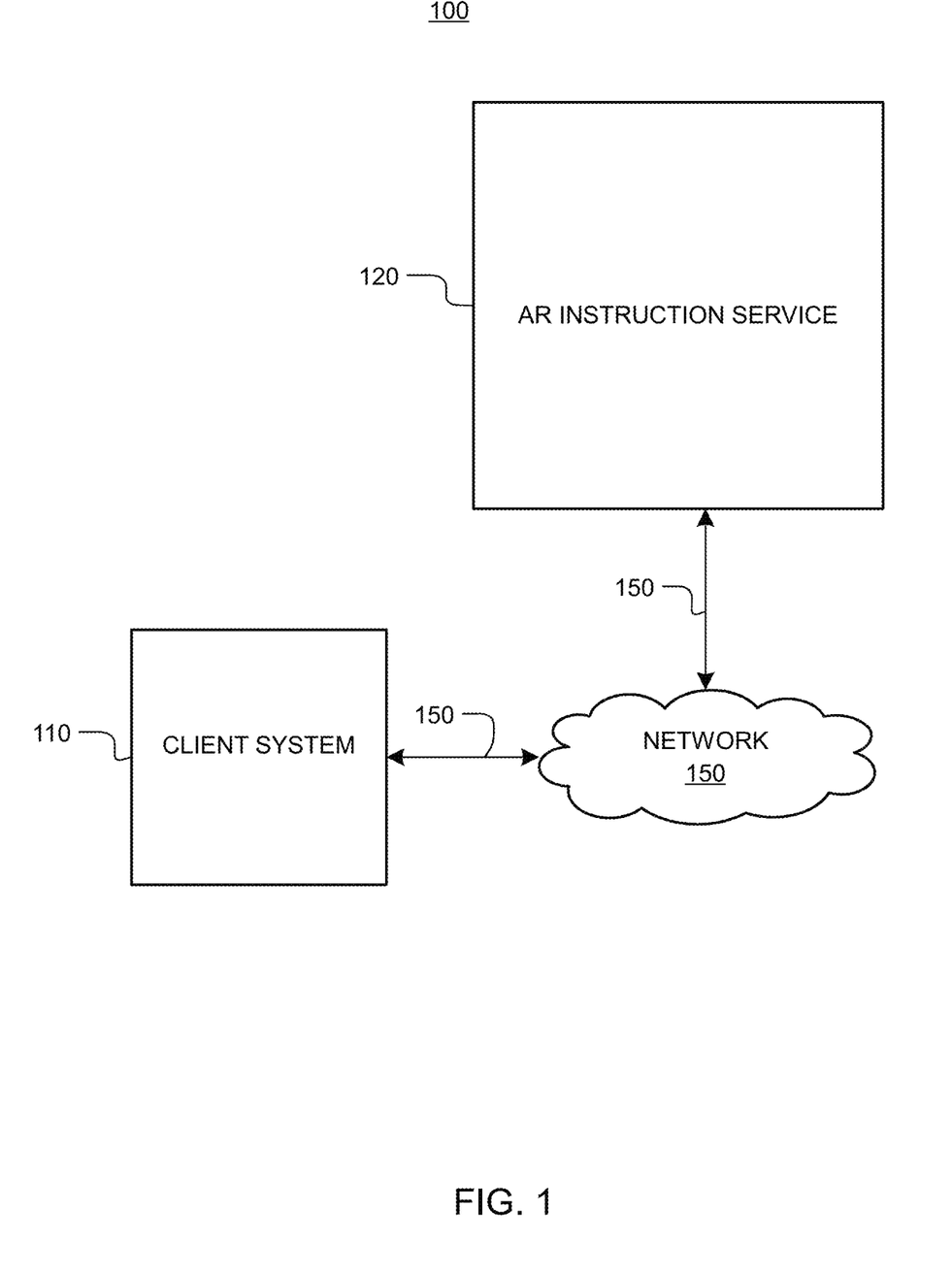
FIG. 1 is illustrates an system environment, according to an example embodiment.

FIG. 1 illustrates a system environment 100, according to an example embodiment. A client system 110 connects to an AR instruction service 120 through a network 150. The network may be any communications network suitable for transmitting data between computing devices, such as, by way of example, a Local Area Network (LAN), a Wide Area Network (WAN), Metropolitan Area Network (MAN), Personal Area Network (PAN), the Internet, wireless networks, satellite networks, overlay networks, or any combination thereof. Client system 110 may be any computing device suitable for interacting with a remote server system, such as, by way of example, a personal computer, mobile computer, laptop computer, mobile phone, smartphone, personal digital assistant, or tablet computer. AR instruction service 120 may be any computing device or combination of devices suitable to provide application services, such as, by way of example, server computers, database systems, storage area networks, web servers, application servers, or any combination thereof.

A user of client system 110 may interact with AR instruction service 120 through any suitable graphical user interface, such as, by way of example, an application, web browser, web application, mobile application, etc. In general, two types of clients would typically connect to AR instruction service 120: end-users in need of AR guidance or assistance, and AR guidance providers that provide real-time object detection models and create guidance instruction sets for the end-users.

Figure 2:
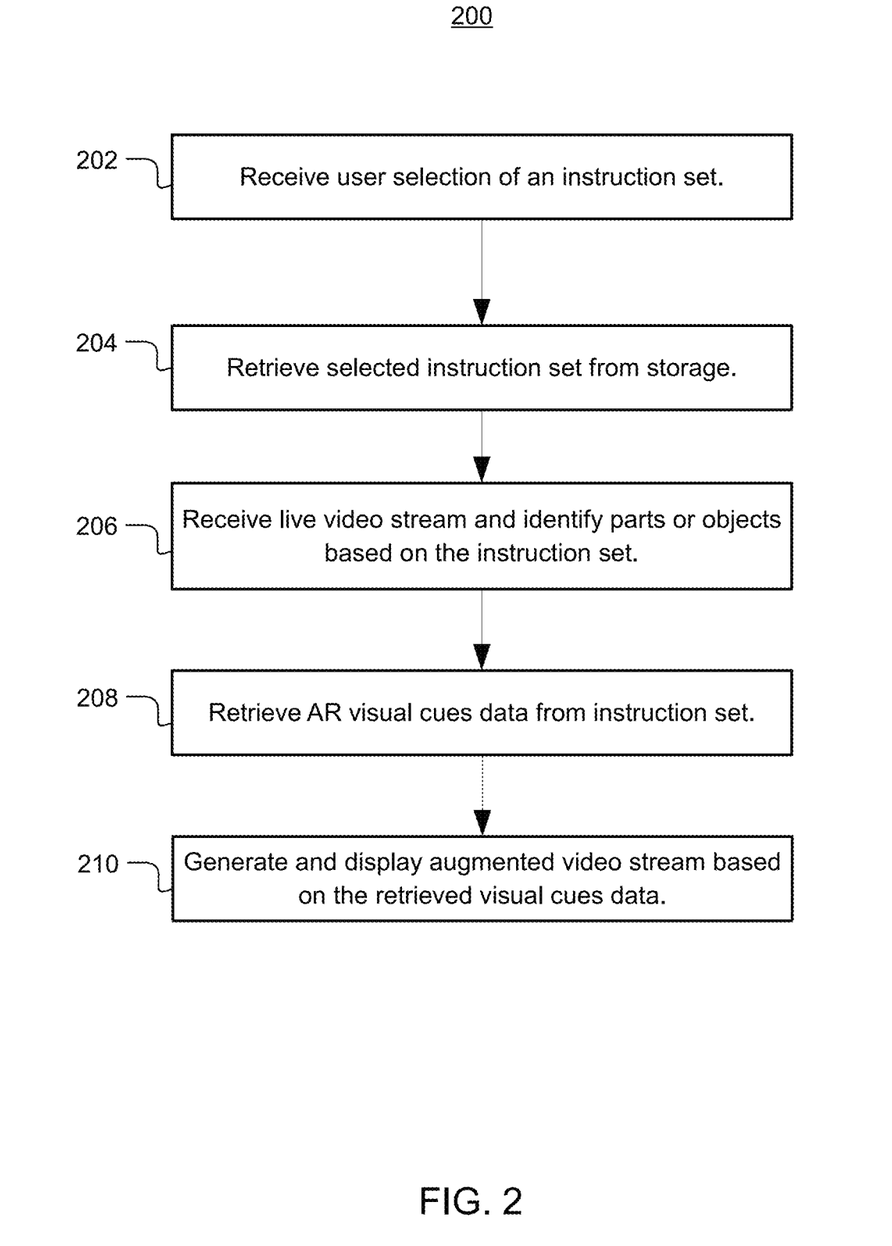
FIG. 2 illustrates a flowchart for a method for using an AR instruction service to assemble a product, according to an example embodiment.

FIG. 2 is a flowchart for a method 200 for using an AR instruction service to assemble a product, according to an example embodiment. Method 200 can be performed by processing logic that can comprise hardware (e.g., circuitry, dedicated logic, programmable logic, microcode, etc.), software (e.g., instructions run on a processing device), or a combination thereof.

At step 202, a client device 110 receives a user selection of an instruction set through a graphical user interface. In particular embodiments, the interface may display a selection of products for which assembly instructions and guidance are available. For example, a user may have purchased a dining room table and searches for the dining table brand and model on the client device interface. If the desired product is found, the user may select to initiate the AR-assisted assembly by making the corresponding selection in the user interface.

Figure 3:
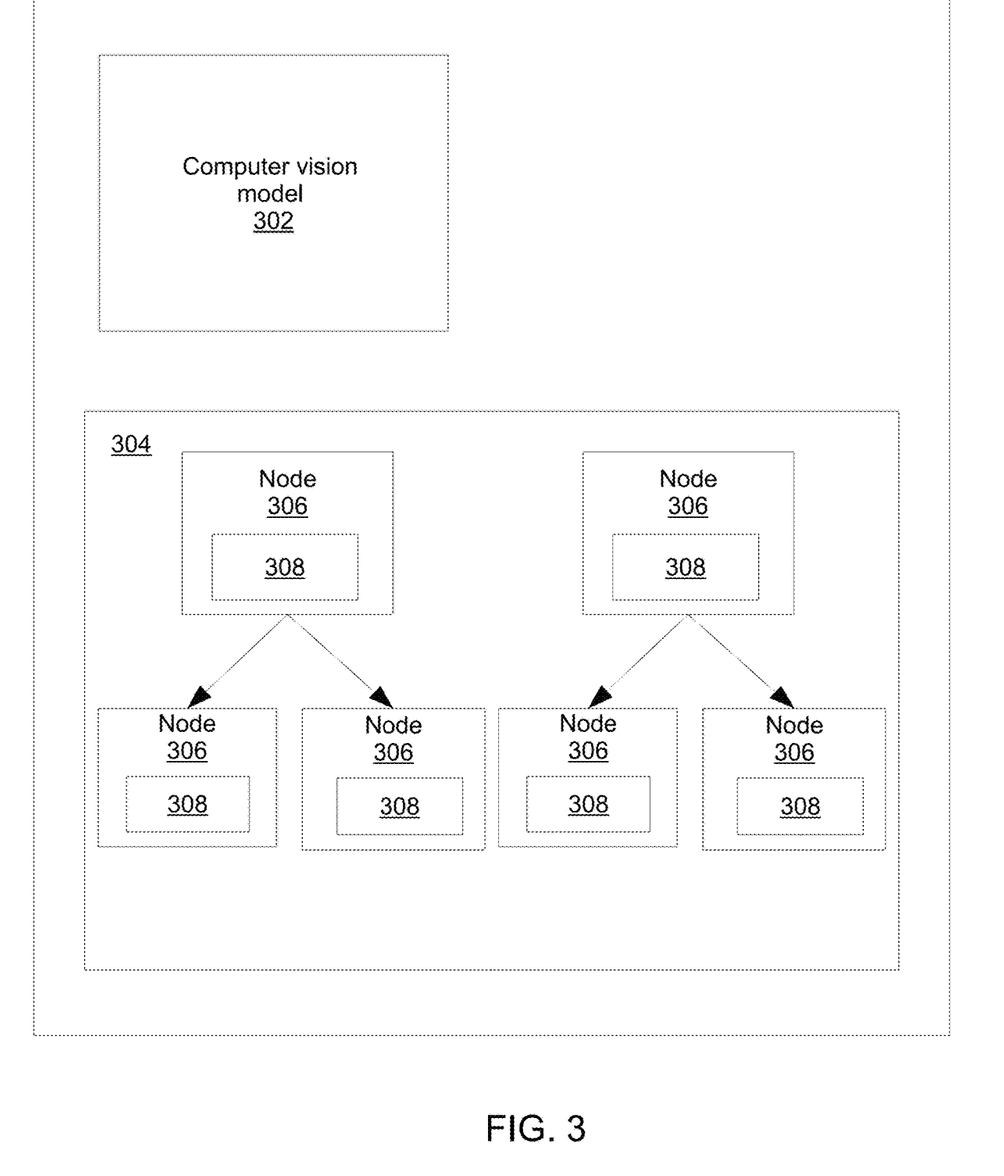
FIG. 3 illustrates the data contents of an AR assembly instruction set, according to an example embodiment.

At step 204, a client device 110 retrieves the selected instruction set from local or remote storage. As an example, client device 110 may download the instruction set from AR instruction service 120 or any suitable third-party server. FIG. 3 illustrates the data contents of an AR assembly instruction set 300, according to an example embodiment. AR assembly instruction set includes a computer vision real-time object detection model 302 for identifying objects and parts in a video stream and a listing of instructions 304 comprising one or more nodes 306 that describe the relationships between the objects and parts. Each node 306 may represent an object or part, along with data and instructions that describe its relationships to other objects or parts. As an example, an instruction set designed for assembling a dining room table may have a computer vision real-time object detection model 302 trained to identify the objects and parts of the table, e.g., table surface, legs, support beams, screws, mounting tools, etc. The listing of instructions 304 may describe the relationship between the parts and objects, for example, a leg A attaches to a table surface corner B using a screw C. In particular embodiments, the listing of instructions 304 may be structured as one or more hierarchical trees, with parent nodes describing a part for assembly and child nodes describing the subparts and relationships between the subparts for assembling the parent part.

In particular embodiments, each instruction 304 may include one or more attributes 308. Attributes may be any suitable content for guiding users through an AR interface. Attributes may include, by way of example and not limitation, part number or identifier, text describing assembly instructions, image/video/audio illustrating how to assemble parts, diagram, sprite, information useful for generating visual cues such as arrows or highlights, computer vision parameters such as a confidence requirements for identifying a part or object, etc.

The computer vision real-time object detection model 302 may use any suitable statistical and/or artificial intelligence computer vision methods for identifying objects in a live video stream. In particular embodiments, computer vision real-time object detection model 302 is a computer vision neural network model trained to identify parts and objects associated with an assembly instruction set. The model may be trained using any suitable image recognition techniques of analyzing multiple images of each part and object. As an example, multiple images of each part are taken from various angles and provided to a deep learning training algorithm with appropriate data, such as the orientation of each image. The algorithm may use the images to generate the model. The model is then run on frames of a video feed and configured to announce when an object or part has been identified and return a label corresponding to the identified object or part.

At step 206, client device 110 receives a live video stream and identifies parts or objects based on the instruction set. The video stream may be received, for example, by taking input from an on-board smartphone camera. Client device 110 analyzes the received video stream using computer vision real-time object detection model 302 to identify one or more parts or objects associated with an instruction node 306. In particular embodiments, the camera feed may be segmented into individual frames that are passed to computer vision real-time object detection model 302, which uses computer vision techniques to identify and label the parts and objects in the frame, and compute a probability of the identification being correct. Client device 110 may then look for the identified label in the instruction listing 304 to determine if a node 306 exists that refers to the label and if the probability is high enough. If so, client device 110 looks into the attributes 308 of the node to determine what AR augmentations should be made As an example, a first instruction node 306 may contain attributes 308 indicating that an identified table leg A attaches to a table surface corner B using a screw C, where A, B, and C correspond to identifiers for these parts in computer vision real-time object detection model 302. In this manner, instruction nodes 306 map each object for assembly to a corresponding object identifiable by computer vision real-time object detection model 302. Client device 110 may thus analyze video frames of the received video to identify table leg A, table surface corner B, and screw C using computer vision techniques, and map them to corresponding instruction data for generating AR visual cues.

At step 208, client device 110 retrieves AR visual cues data from instructions listing 304 corresponding to one or more identified parts or objects. Visual cues data is included in attributes data 308 associated with identified parts or objects, and client device 110 uses this information to create AR visual elements that provide assembly guidance to the user. As an example, the visual cues data may indicate that table leg A and table surface B should have highlighted edges, and an arrow should be displayed from table leg A to table surface B, thus illustrating for the user that table leg A should be connected to table surface B. Visual cues data may be used to generate any suitable visual elements, such as, by way of example and not limitation, instructions in the form of text, voice, diagrams, video, highlights, arrows, etc.

At step 210, client device 110 generates and displays an augmented video stream by adding visual cues to the received video stream based on the retrieved visual cues data. To generate the stream, client 110 may obtain the identified object locations on a current video frame from computer vision real-time object detection model 302. Client device 110 may then position visual cues in the appropriate locations, e.g., pointing an arrow between elements that need to be joined, presenting an instructional video next to the relevant parts, adding label or instructional text next to the relevant parts, etc.

Figure 6:
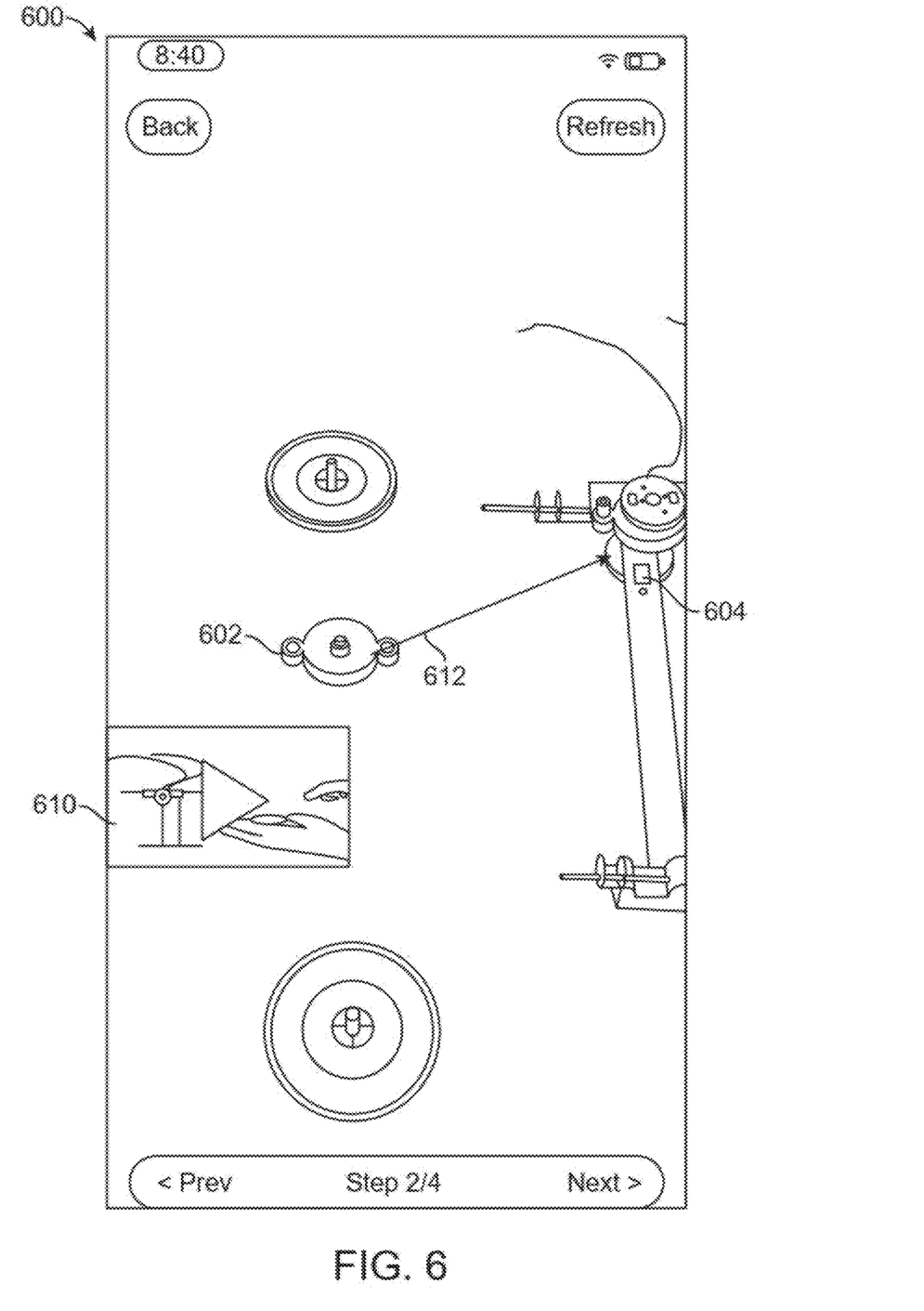
FIG. 6 shows an example interface illustrating an AR guidance video feed, according to an example embodiment.

FIG. 6 shows an example interface 600 illustrating an AR guidance video feed, according to particular embodiments. As shown and explained above, after selecting and downloading an instruction set for a product, a user may set parts and objects for assembly on a surface. The user may then initiate the AR guidance on the client device 110 (e.g., a smartphone) and point the device camera towards the parts. In accordance with method 200, the user would then see visual cues superimposed on the camera feed. In the example of FIG. 6, the user points to parts 602 and 604 and client device 210 adds labels that identify the parts for the user and an arrow 612 to indicate that the user should couple part 602 with part 604 at the corresponding locations. The user is also shown a small embedded video 610 overlaid over a detected part based on the instruction set attributes associated with that part. The video may, for example, demonstrate how to assemble parts 602 and 604.

While this disclosure uses the example of product assembly, embodiments may include any scenario involving identifying parts and objects that need to be related in some form. In particular embodiments, a warehouse employee may use method 200 to obtain guidance on what tasks to perform. For example, an employee may be tasked with walking around a warehouse from one location in the warehouse to a particular room or set of shelves. In accordance with method 200, the employee may download an instruction sets and initiate an AR guidance session on a smartphone. Client device 110 may identify the barrels and spill platforms in the video feed and insert an arrow pointing from a barrel to a spill platform, along with a video and text explaining how the barrels should be moved or placed.

Figure 4:
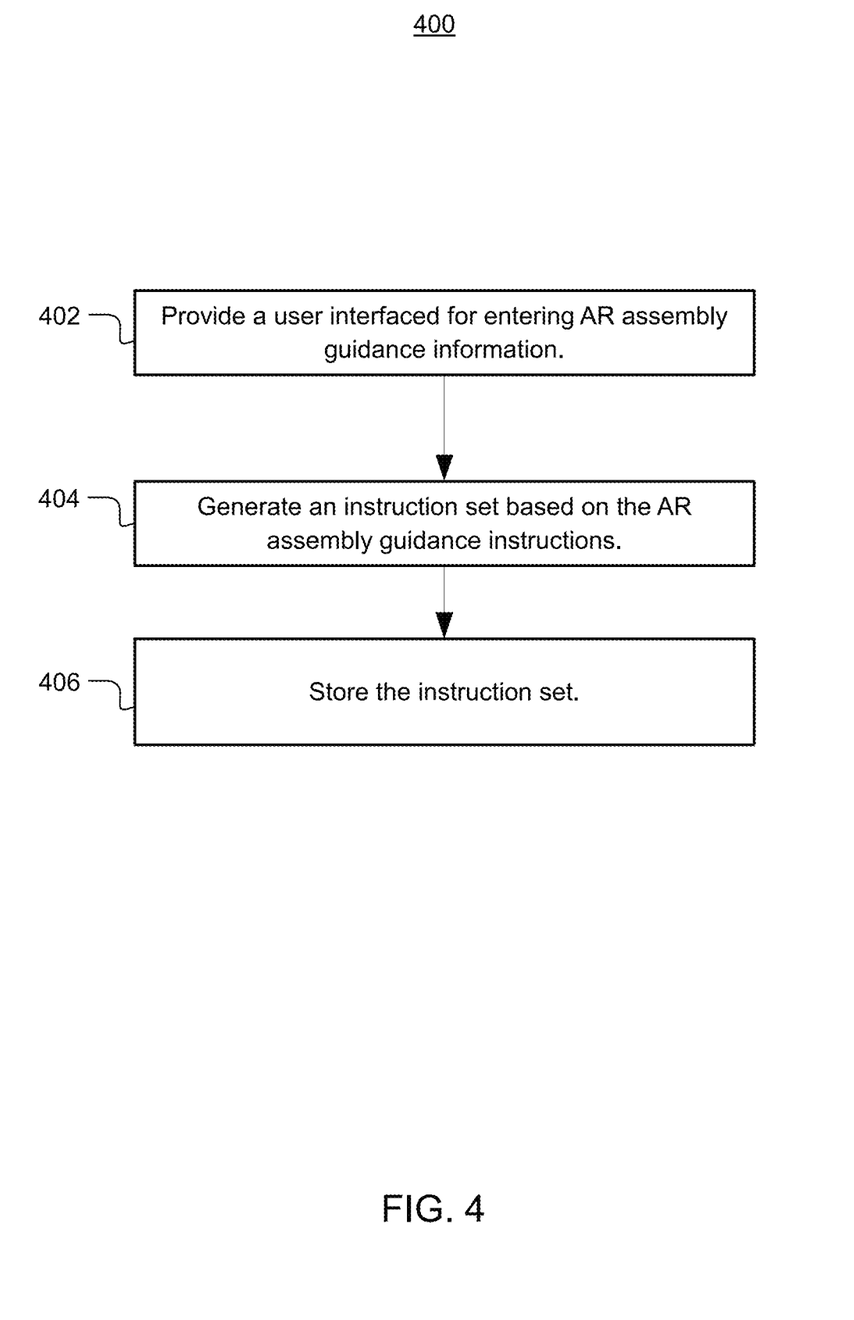
FIG. 4 shows a flowchart for a method for generating instruction sets for an AR assembly guidance system, according to an example embodiment.

FIG. 4 shows a flowchart for a method for generating instruction sets for an AR assembly guidance system, according to particular embodiments. Method 400 can be performed by processing logic that can comprise hardware (e.g., circuitry, dedicated logic, programmable logic, microcode, etc.), software (e.g., instructions run on a processing device), or a combination thereof.

Figure 5:
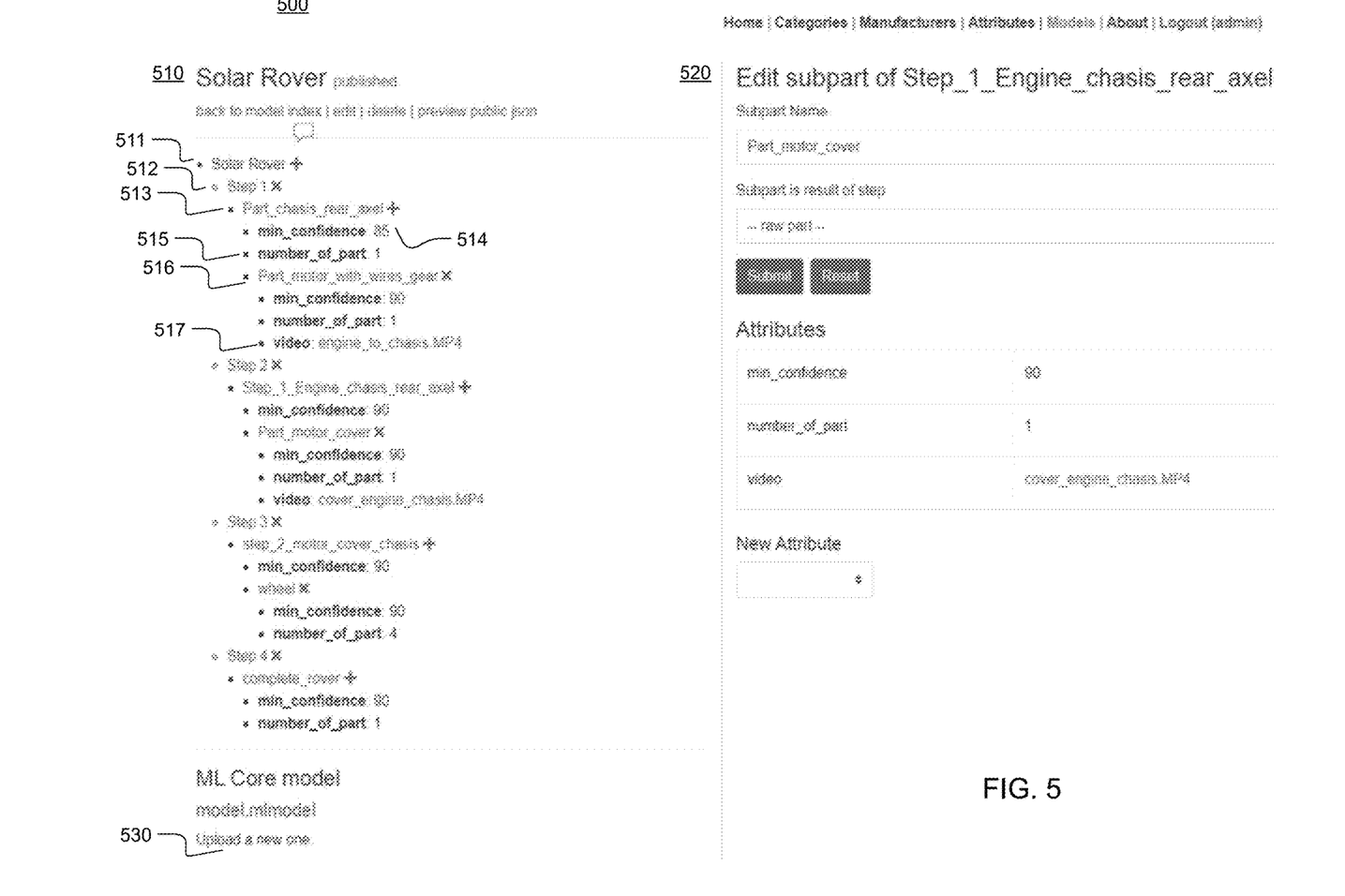
FIG. 5 shows an example server-side user interface for generating instruction sets for an AR assembly guidance system, according to an example embodiment.

At step 402, AR instruction service 120 provides a user interface for entering AR assembly guidance instruction information. FIG. 5 shows an example server-side user interface 500. A seller of goods that require assembly may use this interface to generate instruction sets for their goods. These instruction sets may be added to a database so customers can download them, as explained above with reference to method 200.

Interface 500 may include input elements for providing a computer vision real-time object detection model along with instruction nodes, relationships and attributes that form part of an instruction set 304. In an example, interface 500 includes a hierarchy display portion 510 showing a hierarchy of instructions, parts, and objects. In the example shown, a solar rover part 511 is a main node including plurality of instruction steps 512 describing subparts and objects and their relationships that form the assembled solar rover. Each instruction step 512 contains one or more parts or objects 513 required for completion of the instruction step 512, and each part or object 513 comprises one or more attributes. In this example, each part has an attribute 514 representing a minimum confidence score that the computer vision real-time object detection model must satisfy to considered that part to be identified, and a quantity 515 of this part required by the step. As explained above, parts or objects 513 may contain any number of attributes, such as attribute 517 specifying a video file to play. Furthermore, parts 513 may further comprise subparts, such as subpart 516 (e.g., motor with wires and gears may be a subpart 516 of a rear axle chassis part 513, which is a part of the solar rover instruction step 511 (Step 1).

In the example of FIG. 5, interface 500 further includes a data entry portion 520 for populating the hierarchy 510 by entering information for objects, parts, subparts, and attributes. The interface further includes a portion 530 for providing a computer vision real-time object detection model 302, for example, in the form of a file. In particular embodiments, parts and objects are specified using labels that are mapped to the corresponding parts and objects in the computer vision real-time object detection model 302. In this manner, when computer vision real-time object detection model 302 identifies a part or object, the client device 110 may refer to the corresponding instruction retrieve information about instructions and attributes, such as visual cues that should be generated.

At step 404, AR instruction service 120 generates an instruction set 304 based on AR assembly guidance instruction information received through the user interface 500. The instruction set may be stored in any suitable format, such as, by way of example and not limitation, XML, JSON, YAML, etc. At step 406, AR instruction service 120 stores the instruction set for later retrieval, as explained above with respect to method 200.

Figure 7:
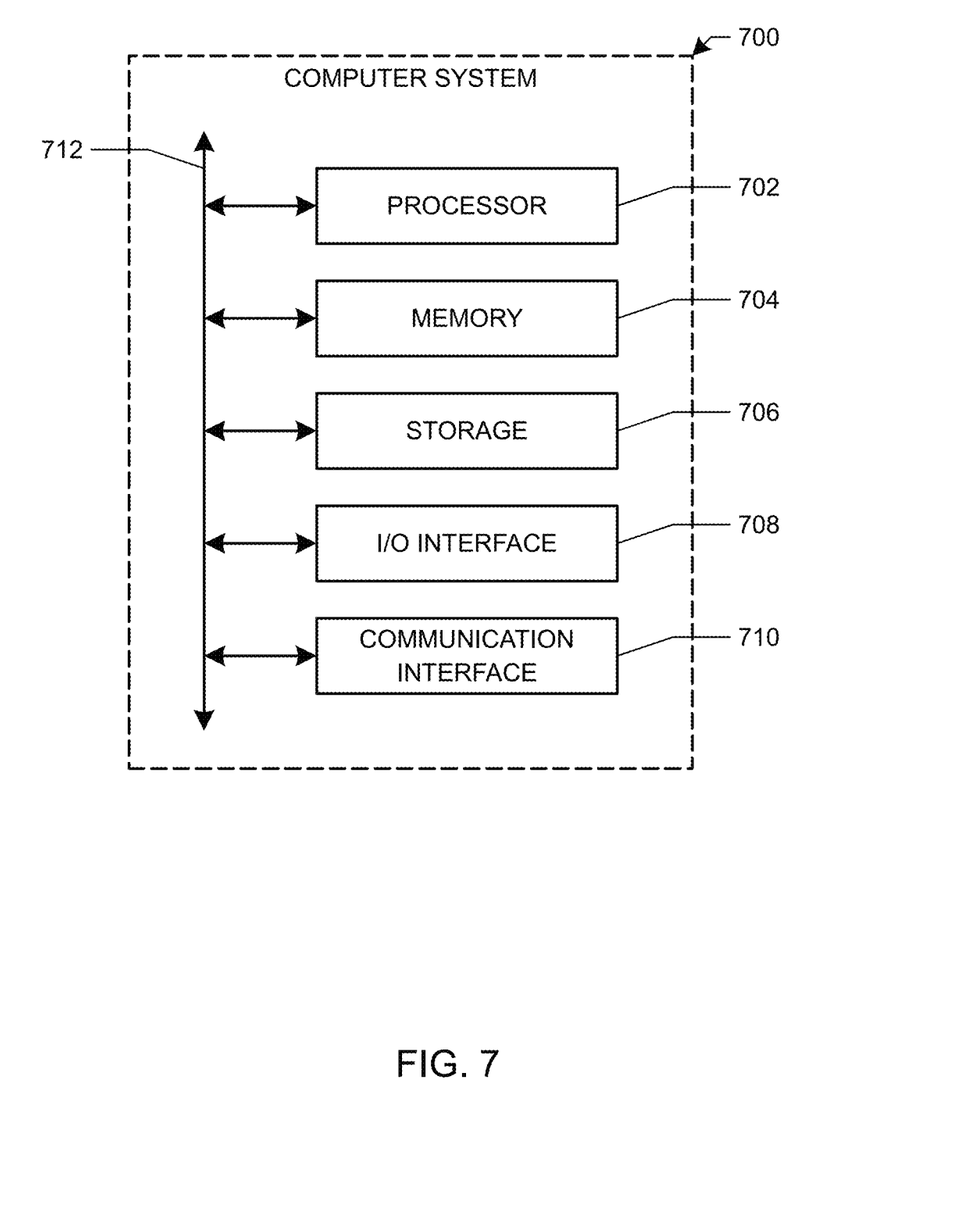
FIG. 7 is an example computer system useful for implementing various embodiments.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example, computer system 700 may be an embedded computer system, a desktop computer system, a laptop or notebook computer system, a mainframe, a mobile telephone, a personal digital assistant (PDA), a server, a tablet computer system, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, memory 704 includes random access memory (RAM). This RAM may be volatile memory, where appropriate Memory 704 may include one or more memories 704, where appropriate. Although this disclosure describes and illustrates particular memory, this disclosure contemplates any suitable memory.

In particular embodiments, storage 706 includes mass storage for data or instructions. As an example, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer-implemented method comprising, by at least one processor:
   providing a graphical user interface for entering information associated with assembly instructions;
   receiving assembly instruction information through the user interface, the assembly instruction information comprising:
      a computer vision real-time object detection model trained to identify a plurality of parts or objects in a video stream;
      one or more instruction step nodes, each of the nodes including a mapping to at least one of the plurality of parts or objects identifiable by the computer vision real-time object detection model; and
      one or more attributes associated with the one or more instruction step nodes;
   generating an assembly instruction set based on the received assembly instruction information; and
   transmitting the assembly instruction set to a client device for displaying a graphical user interface showing graphical elements superimposed on a video stream based on the assembly instruction set.

2. The method of claim 1, wherein the one or more attributes comprise at least one of a part number, a text, a video, a diagram, a sprite, a sound, or a confidence score.

3. The method of claim 1, wherein the computer vision real-time object detection model is neural network model trained to identify objects or parts in a video stream frame.

4. The method of claim 1, wherein assembly instruction information further comprises one or more instruction step child nodes.

5. The method of claim 1, wherein the assembly instruction set comprises at least one of an XML file, a JSON file, or a YMAL file.

6. The method of claim 1, wherein the graphical elements comprise at least one of superimposed arrows, superimposed highlights, or a superimposed video.

7. A system, comprising:
   a memory; and
   at least one processor coupled to the memory and configured to:
      provide a graphical user interface for entering information associated with assembly instructions;
      receive assembly instruction information through the user interface, the assembly instruction information comprising:
         a computer vision real-time object detection model trained to identify a plurality of parts or objects in a video stream;
         one or more instruction step nodes, each of the nodes including a mapping to at least one of the plurality of parts or objects identifiable by the computer vision real-time objection detection model; and
         one or more attributes associated with the one or more instruction step nodes;
      generate an assembly instruction set based on the received assembly instruction information; and
      transmit the assembly instruction set to a client device for displaying a graphical user interface showing graphical elements superimposed on a video stream based on the assembly instruction set.

8. The system of claim 7, wherein the one or more attributes comprise at least one of a part number, a text, a video, a diagram, a sprite, a sound, or a confidence score.

9. The system of claim 7, wherein the computer vision real-time object detection model is neural network model trained to identify objects or parts in a video steam frame.

10. The system of claim 7, wherein assembly instruction information further comprises one or more instruction step child nodes.

11. The system of claim 7, wherein the assembly instruction set comprises at least one of an XML file, a JSON file, or a YMAL file.

12. The system of claim 7, wherein the graphical elements comprise at least one of superimposed arrows, superimposed highlights, or a superimposed video.

13. A tangible non-transitory computer-readable medium having instructions stored thereon that, when executed by at least one computing device, causes the at least one computing device to perform operations comprising:
   providing a graphical user interface for entering information associated with assembly instructions;
   receiving assembly instruction information through the user interface, the assembly instruction information comprising:

a computer vision real-time object detection model trained to identify a plurality of parts or objects in a video stream;

one or more instruction step nodes, each of the nodes including a mapping to at least one of the plurality of parts or objects identifiable by the computer vision real-time object detection model; and one or more attributes associated with the one or more instruction step nodes;

generating an assembly instructions et based on the received assembly instruction information; and transmitting the assembly instruction set to a client device for displaying a graphical user interface showing graphical elements superimposed on a video stream on the assembly instruction set.

14. The non-transitory computer-readable medium of claim 13, wherein the one or more attributes comprise at least one of a part number, a text, a video, a diagram, a sound, or a confidence score.

15. The non-transitory computer-readable medium of claim 13, wherein the computer vision real-time object detection model is neural network model trained to identify objects or parts in a video stream frame.

16. The non-transitory computer-readable medium of claim 13, wherein assembly instruction information further comprises one or more instruction step child nodes.

17. The non-transitory computer-readable medium of claim 13, wherein the assembly instruction set comprises at least one of an XML file, a JSON file, or a YMAL file.

18. The non-transitory computer-readable medium of claim 13, wherein the graphical elements comprise at least one of superimposed arrows, superimposed highlights, or a superimposed video.

* * * * *